No. 690,188. Patented Dec. 31, 1901.
R. E. ROSEWARNE.
PASTING DEVICE FOR CIGARETTE MACHINES.
(Application filed Apr. 30, 1901.)
(No Model.) 2 Sheets—Sheet 1.
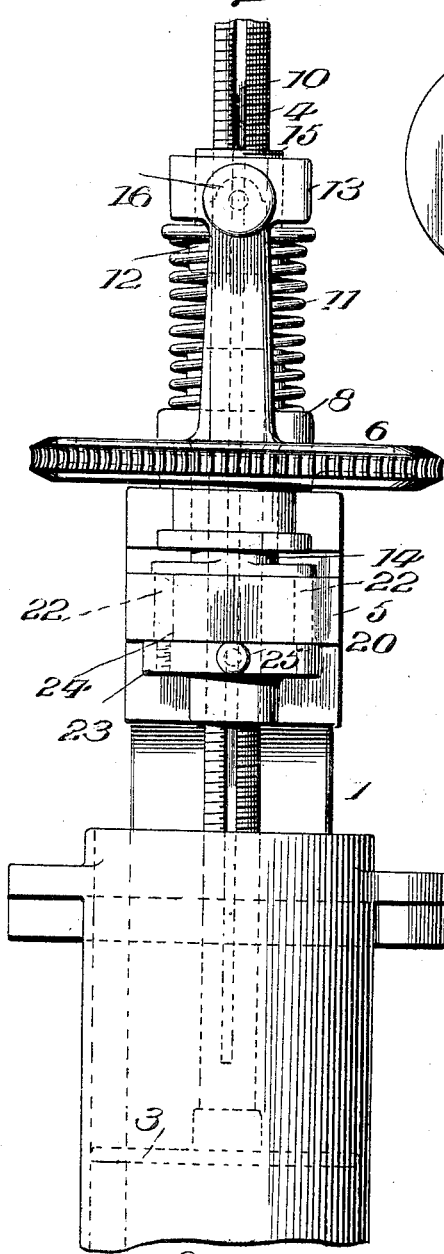
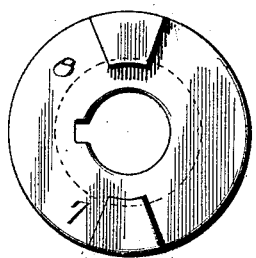
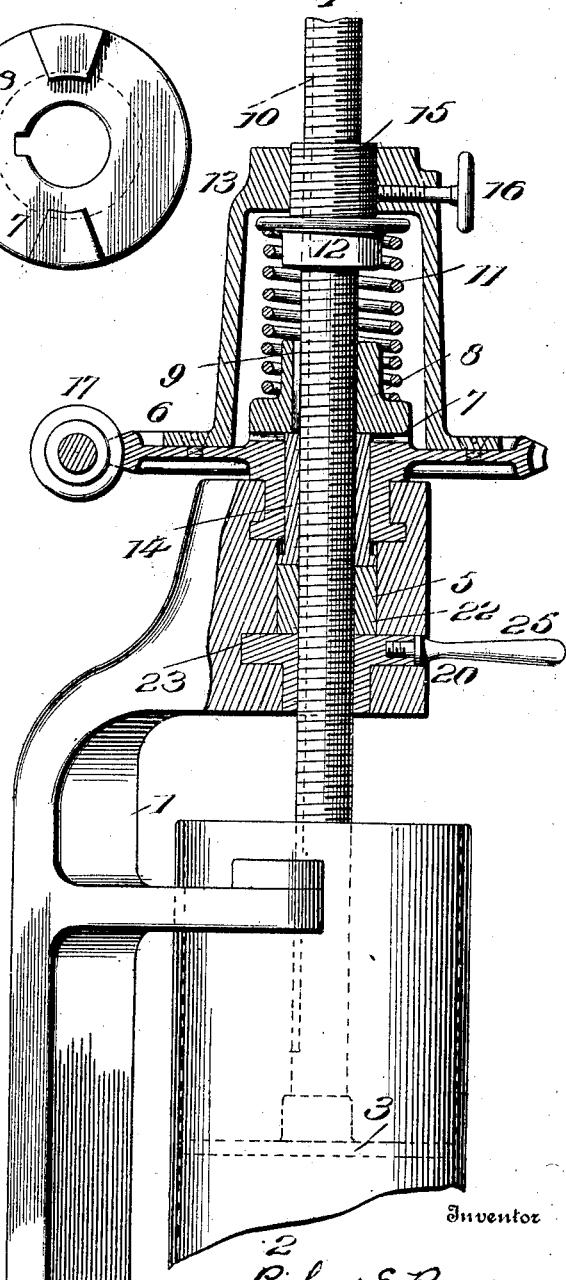
Witnesses
Harry A. Knight
Inventor
Richard E. Rosewarne
By
Knight Bros
Attorneys No. 690,188. Patented Dec. 31, 1901.
R. E. ROSEWARNE.
PASTING DEVICE FOR CIGARETTE MACHINES.
(Application filed Apr. 30, 1901.)
(No Model.) 2 Sheets—Sheet 2.
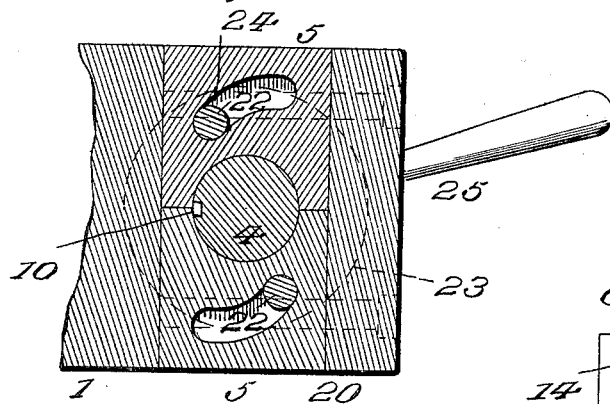
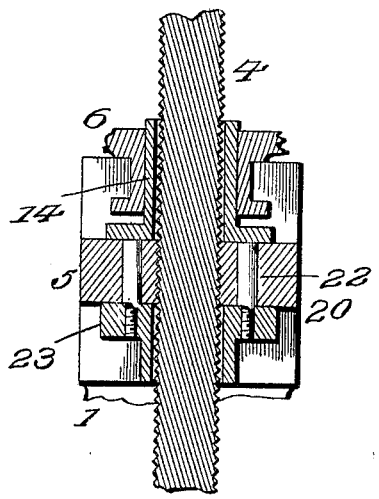
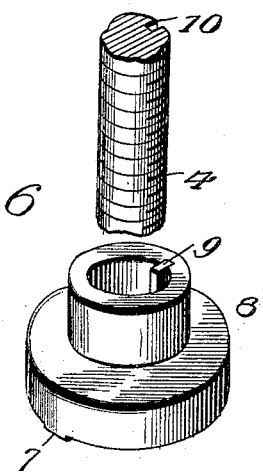
Witnesses
Inventor
Richard E. Rosewarne
By Knight Bros
Attorneys

UNITED STATES PATENT OFFICE.

RICHARD E. ROSEWARNE, OF COVINGTON, KENTUCKY, ASSIGNOR TO THE MILLER, DU BRUL & PETERS MANUFACTURING COMPANY, OF CINCINNATI, OHIO, A CORPORATION OF OHIO.

PASTING DEVICE FOR CIGARETTE-MACHINES.

SPECIFICATION forming part of Letters Patent No. 690,188, dated December 31, 1901.

Application filed April 30, 1901. Serial No. 58,156. (No model.)

*To all whom it may concern:*

Be it known that I, RICHARD E. ROSEWARNE, a citizen of the United States, and a resident of Covington, in the county of Kenton and State of Kentucky, have invented certain new and useful Improvements in Pasting Devices for Cigarette-Machines, of which the following is a specification.

My invention is designed more especially for supplying paste or adhesive material to the wrapper-paper of continuous-filler cigarette-machines, and has special reference to the type of such a device covered by United States Letters Patent No. 671,417, granted April 2, 1901, to Napoleon Du Brul, which describes and claims "a pasting device provided with a feed-screw, means for turning said feed-screw, and a yielding turning connection between them, whereby the feeding of the screw is stopped under abnormal pressure of the feed," thus preventing too great an expulsion of the adhesive substance and avoiding danger of breaking the parts. My invention provides a novel construction of the yielding connection between the feed-screw and the means for turning it, as well as other novel details of construction, which will be hereinafter fully described, and particularly pointed out in the claims, reference being had to the accompanying drawings, forming part of this specification, in which—

Figure 1 is a side view of a portion of a cigarette-machine with its pasting device, the mechanism for feeding the expelling-plunger being shown in vertical section. Fig. 2 is a side elevation of the screw-feeding mechanism in a plane at right angles to Fig. 1. Fig. 3 is a detail view of the yielding clutch through which the feed-screw is turned. Fig. 4 is a horizontal section through the expanding nut. Fig. 5 is an axial section in the plane at right angles to Fig. 1; and Fig. 6 is a detail view of the screw and the upper clutch member, which is splined to said screw.

1 represents a bracket or support upon which is mounted a paste-reservoir 2, having a plunger 3, that is slowly depressed therein by a feed-screw 4, rotating in a fixed nut 5, to expel the paste or adhesive material from the reservoir to mechanism which applies the paste to the edge of the wrapper-paper. All these parts are well understood in machines of this class and need not be described in further detail here.

The feed-screw 4 is turned to feed it through its nut 5 by a worm-wheel 6, which has driving connections with said feed-screw through the medium of a clutch 7, which is shown more clearly in Fig. 3, and the parts of which will separate in the event that too much pressure is put upon the plunger by the feed-screw, as will be explained. One part of the clutch is formed in the face of the worm-wheel 6 and the other part of said clutch is formed in the face of a turning head 8, which has a spline 9, that enters a longitudinal groove 10 in the feed-screw, and is thereby adapted to rotate the feed-screw, while permitting the feed-screw to have axial movement through the turning head. The turning head may move upward, but is held normally down with its clutch-face in engagement with that on the worm-wheel 6 by a spring 11, the upper end of which has a cap 12 resting beneath a yoke 13, that projects upwardly from and is carried by the worm-wheel 6. When the screw 4 is turned relatively to the nut 5, it is obvious that either the screw must feed downward or the nut must feed upward. The nut is normally held against feeding upward by the spring 11. The force of this spring is sufficient to cause the nut to remain stationary and the screw to feed downward, even though the feed of the screw receives considerable opposition from the adhesive material beneath the plunger, and consequently the feed of the screw expels said adhesive material; but in the event that the feeding of the screw is more rapid than the escape of the adhesive material will permit opposition to the downward movement of the screw will be sufficient to overbalance the spring 11, and instead of the screw feeding downward the nut 5 will begin to feed upward on the screw, compressing spring 11. As soon as this begins to take place the bushing 14, which has axial movement in the wheel 6, will be forced upward by the nut 5 and will raise the upper clutch member or turning head 8 out of engagement with the worm-wheel 6, so that thereafter the worm-wheel may continue its rotation without rotating the part 8, and therefore without rotating the screw 4, and said screw does not rotate again until the pressure of spring 11, exerted through head 8, bushing 14, nut 5, screw 4, and plunger 3, expels enough of the adhesive material to permit the plunger to settle and bring the clutch-face of the head 8 back into engagement with the clutch-face of the wheel 6, when the rotation of the screw will be resumed. By regulating the tension on spring 11, which may be done by adjusting the threaded follower 15 in the yoke 13 and fixing the follower to its adjustment by the set-screw 16, the degree of pressure exerted by the plunger 3 upon the adhesive material before the plunger will rise to disconnect the clutch may be regulated at will. This adjustment, together with a suitable selection of turning connections which drive the wheel 6, will enable the operator to control the expulsion of the adhesive material from the reservoir to a nicety.

The worm-wheel 6 may be turned by the worm 17, rotated through a suitable gearing from the cigarette-machine, or said wheel 6 may be constructed to be driven by any other suitable means.

In order to permit the convenient removal of the plunger from the paste-cup without turning back the feed-screw in its nut, which would take considerable time, the nut 5 is formed in two parts 5ª and 5ᵇ, as shown more clearly in Fig. 4, and a collar 20 has pins 21 projecting vertically into eccentric slots 22, formed in the parts of said nut 5, so that when the nut is rotated slightly by the lever 23 the parts of the nut will be forced away from the screw and said screw is free to move longitudinally. The pins 21 are long enough to retain their control over the parts of the nut 5 even though the latter be raised, as hereinbefore referred to, to disengage the clutch. An important novel advantage accrues from this in that when the nut has been fed upward in opposition to spring 11, by reason of abnormal obstruction to the downward feed of the plunger 3 and the machine has been stopped with the parts in this condition, the nut may be permitted to fall again to bring the parts of the clutch 7 into engagement by simply spreading the nut 5 to disengage it from the screw.

Having thus described my invention, the following is what I claim as new therein and desire to secure by Letters Patent:

1. In combination with a paste-reservoir having an expelling-plunger, a feed-screw advancing said plunger, an axially-movable, spring-pressed nut advancing the screw, turning connections through which relative rotation between the screw and nut is effected, a clutch interposed in said turning connections, and displacing connection between the axially-movable nut and the movable member of the clutch, acting upon the latter in the direction of releasing movement.

2. In combination with a paste-reservoir having an expelling-plunger, a rotatable feed-screw, advancing said plunger, a non-rotating, axially-movable nut advancing the screw, turning connections through which rotation is imparted to the screw, a clutch interposed in said turning connections, having one of its members movable into and out of engagement with the other member of the clutch, a spring pressing the members of the clutch together, and displacing connection between the axially-movable nut and the movable member of the clutch, acting upon the latter in the direction to release it.

3. In combination with a paste-reservoir having an expelling-plunger and a feed-screw advancing said plunger; means for rotating said feed-screw, including a clutch having its members coaxial with the feed-screw, one member rotating about the screw and its other member splined to but axially movable on the screw, means for yieldingly pressing the members of the clutch together, and an axially-movable, non-rotating feed-nut held in the direction of feeding by said movable clutch member and movable upward under abnormal pressure beneath the plunger and having displacing connection with the movable member of said clutch.

4. In a pasting device, employing a reservoir, an expelling-screw, and a screw-fed plunger; means for advancing the screw comprising an axially-movable non-rotating nut on said screw, a driving gear-wheel concentric with said screw, an axially-movable clutch member having clutch connection with the gear-wheel and splined connection with the screw, a spring pressing the clutch member into engagement with the gear-wheel, and displacing connection between the nut and the movable member of the clutch, whereby the nut disconnects the clutch by its movement.

5. As a means for advancing the feed-screw of a pasting device for cigarette-machines, the combination of a longitudinally-movable, non-rotating nut 5, through which the screw advances, a coaxial, longitudinally-movable turning head 8 having splined connection with the feed-screw, a spring pressing downward upon said turning head, a driving-wheel 6 rotating about the screw, said turning head and driving-wheel being formed with engaging clutch-faces, and a displacing connection between the longitudinally-movable nut and said turning head, whereby the latter is moved in opposition to its spring by the longitudinal movement of the nut.

6. In a pasting device for cigarette-machines, the combination of the reservoir, the expelling-plunger, the feed-screw, the longitudinally-movable nut, the turning wheel, the bushing working through the turning wheel and movable by the longitudinal movement of the nut, the driving-head splined to the screw and movable longitudinally by the bushing, the clutch between the driving-head and turning wheel, the spring above said driving-head, and the yoke carried by the turning wheel and sustaining the upper end of the spring.

The foregoing specification signed at Cincinnati, Ohio, this 22d day of March, 1901.

RICHARD E. ROSEWARNE.

In presence of—
H. S. KNIGHT,
NAPOLEON DU BRUL.